Figure 1:
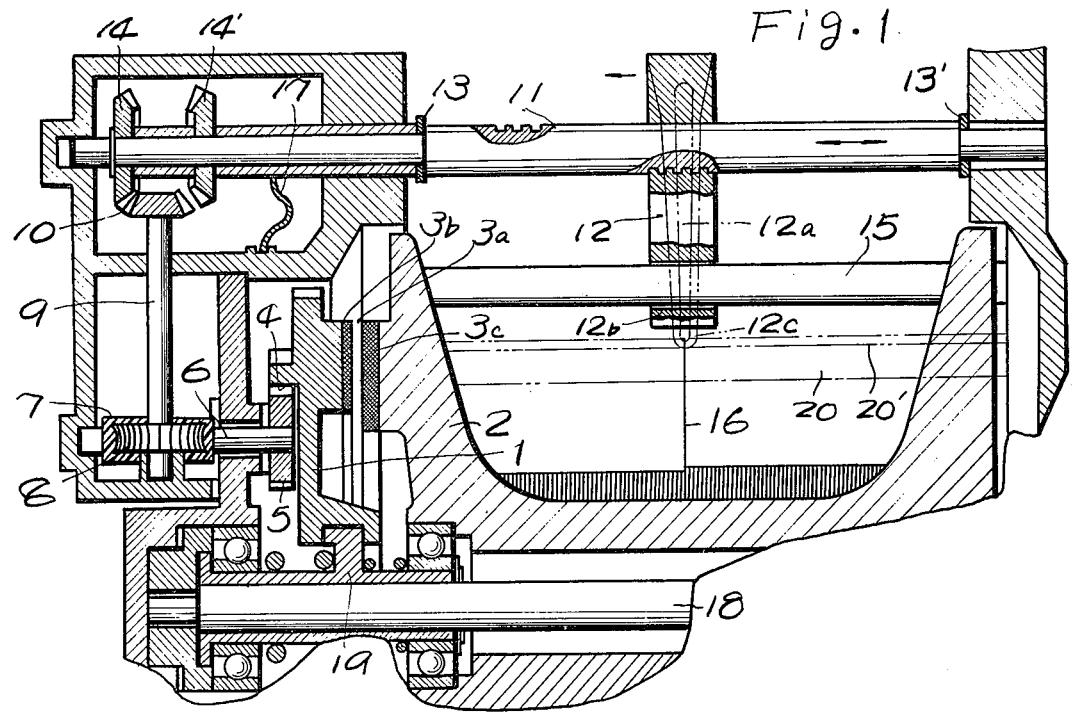

United States Patent
Miyamae

[11] 3,913,859
[45] Oct. 21, 1975

[54] FISHING LINE GUIDE DEVICE
[76] Inventor: Toshiaki Miyamae, 16, 2-Ban, 2-Chome, Nishi-Iwata, Higashi-Osaka, Osaka, Japan
[22] Filed: Aug. 30, 1973
[21] Appl. No.: 393,064

[30] Foreign Application Priority Data
Sept. 21, 1972 Japan.............................. 47-110714

[52] U.S. Cl............................. 242/84.41; 242/158.2
[51] Int. Cl.²........................................... A01K 89/04
[58] Field of Search............ 242/84.41, 84.42, 84.43, 242/84.4, 86.8, 158.2

[56] References Cited
UNITED STATES PATENTS

| | | | |
|---|---|---|---|
| 1,001,857 | 8/1911 | Jernstedt........................... | 242/84.41 |
| 1,616,068 | 2/1927 | Trenck........................... | 242/158.2 X |
| 1,816,909 | 8/1931 | Larsen........................... | 242/158.2 X |
| 1,819,724 | 8/1931 | Broadwell et al................. | 242/84.42 |
| 2,305,045 | 12/1942 | Torrence.................... | 242/84.42 UX |
| 3,612,425 | 10/1971 | Shakespeare..................... | 242/84.42 |

Primary Examiner—Billy S. Taylor
Attorney, Agent, or Firm—Toren, McGeady and Stanger

[57] ABSTRACT

In a fishing line guide device mounted on a fishing reel which includes a spool for winding the fishing line and a transmission gear for selectively rotating the spool, the guide device includes a gear mechanism driven by the transmission gear and arranged to drive a first bevel gear. A pair of facing second bevel gears are fixedly mounted on a slidable threaded shaft so that one or the other can be selectively engaged with the first bevel gear for rotating the threaded shaft clockwise and counterclockwise. A guide member is threadedly mounted on the threaded shaft so that it moves between a pair of retaining rings as the shaft rotates. As the guide member contacts one of the retaining rings it causes the sliding shaft to slide in its axial direction displacing one of the second bevel gears from engagement with the first bevel gear and moving the other second bevel gear into engagement with the first bevel gear for reversing the direction of the movement of the guide member along the threaded shaft until it contacts the other retaining ring and again reverses direction in the same manner.

3 Claims, 2 Drawing Figures

FISHING LINE GUIDE DEVICE

The present invention relates to a fishing line guide device for rewinding a released fishing line, and more particularly it relates to a novel fishing line guide device arranged to move the fishing line axially of a reel mounted on a fishing rod for rewinding the line uniformly onto the reel.

In order to enjoy an offshore fishing excursion by boat, it is necessary for a fisherman to, swiftly rewind a desired length of released fishing line all with uniformity onto a fishing reel along the full length of its spool shaft. For this purpose, there are available on the market various fishing line guide devices adapted to retrieve the fishing line onto a fishing reel across the full length of its spool shaft. However, they are all very complicated in structure and difficult of practically handling so that eventually, an experienced fisherman cannot but put one of his fingers on the reel portion and move it along the spool shaft as a fishing line is retrieved thereby to rewind the fishing line uniformily with equal tension on the spool across its full length.

Accordingly, the present invention has been devised to eliminate all the above-mentioned drawbacks and disadvantages, and has as one of its principal objects the provision of a novel type fishing line guide device that can be mounted on a fishing reel.

It is another object of the invention to provide a unique type fishing line guide device that can guide the fishing line to be uniformly rewound on a fishing reel without producing entangled line portion at whatever speed the fishing line may be rewound either electrically or by hand.

It is still another object of the invention to provide a fishing line guide device, which is simple in structure and producible at a low cost.

Figure 2:
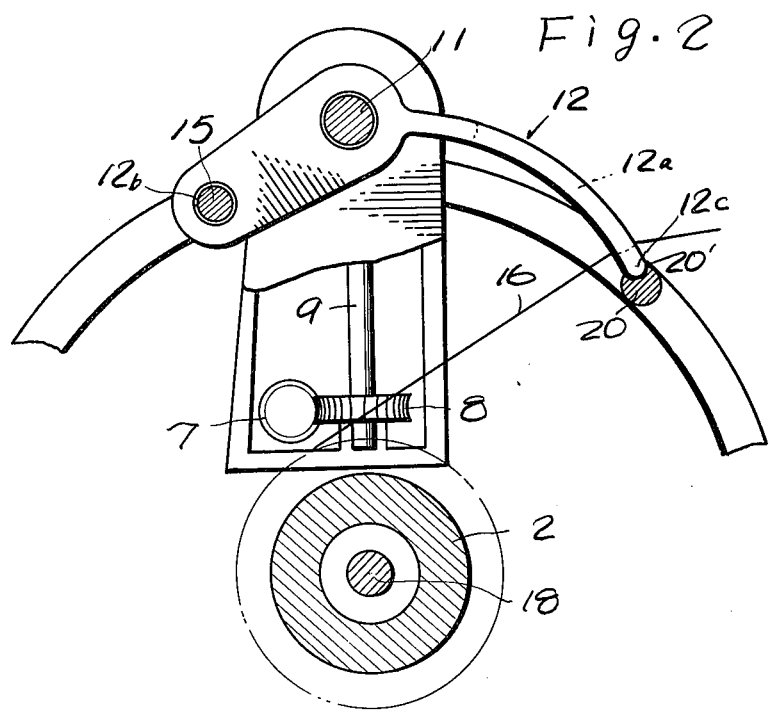

These and other objects, feature and advantages of the invention will become apparent in the following description and claim made with reference to the accompanying drawing, in which:

FIG. 1 is a partial vertical cross-sectional front view showing the elemental parts of a fishing line guide device on a fishing reel in accordance with the present invention; and FIG. 2 is a right hand side view of FIG. 1 partly in section.

Referring now to a preferred embodiment of the invention in conjunction with the accompanying drawing, reference numeral 1 designates a transmission gear on one side of which is mounted a clutch 3a comprising an annular pressing plate 3b for abutting on an annular receiving plate 3c mounted on one side of a reel spool 2. The other side of the transmission gear 1 is provided with an inner gear 4 disposed in meshed engagement with a small gear 5 mounted on one end of a shaft 6 on the other end of which is mounted a worm 7. The worm 7 is in engagement with a worm wheel 8 mounted on the lower end of a shaft 9 on the top of which is mounted a bevel gear 10. Positioned over the reel spool 2 is a downwardly bent fishing line guide member 12 having an internally threaded hole formed with a slot 12a in its formost end. As shown in FIG. 2 guide member 12 is screwably engaged through its threaded hole with a rotatable threaded shaft 11 adapted to slide slightly in axial direction thereof. The rotatable threaded shaft 11 is provided near each of its ends with a retaining ring 13, 13' and further provided at its right hand end as viewed in FIG. 1 with a pair of bevel gears 14, 14' suitably spaced apart interval so that the aforesaid bevel gear 10 is engageable with one of these bevel gears 14, 14' at a time to permit the fishing line guide member 12 to move back and forth axially along the rotatable threaded shaft 11, the result being that a desired length of released fishing line 16 can be retrieved uniformly onto the reel spool 2 with equal tension.

Further, the transmission gear 1 is arranged so that a shaft 18 supporting the gear 1 is slidable in the axial direction thereof so as to slide the gear 1 by means of a retainer 19 fixed to the shaft 18 thereby transmitting a rotating force to the reel spool 2 through the annular pressing plate 3b positioned on the side of the gear 1 and the annular receiving plate 3c positioned on the side of the reel spool 2.

The downwardly bent fishing line guide member 12 note FIG. 2, is in threaded engagement with the rotatable threaded shaft 11 and is moved at an equal speed along the shaft 11 when the latter is rotated by means of one of the bevel gears 14, 14' with which it is engaged. For a fuller understanding, when the bevel gear 10 is engaged for example with the left hand side bevel gear 14 as shown in FIG. 1, the guide member 12 is moved to the left along shaft 11 until it contacts the retaining ring 13 positioned closer to the left hand side of the rotatable threaded shaft 11 as viewed in FIG. 1, whereby the shaft 11 is slid to the left, consequently causing the bevel gear 14 to move leftward away from the bevel gear 10 and to bring the bevel gear 14' in engagement with bevel gear 10.

Incidentally, the space between the pair of bevel gears 14, 14' mounted in facing relation with one another is such that the bevel gear 10 can engage only one of these bevel gears 14, 14' at a time and when disengaged from one it comes into engagement with the other of the bevel gear 14, 14' when the threaded shaft 11 is slid to some extent, there being enough momentum in guide 12 and the associated drive means to carry the shifting of shaft 11 until meshing engagement is assured.

In the accompanying drawing, the guide member 12 has a hole 12b bored in one end and reference numeral 15 denotes a fixed guide shaft which fits through the hole 12b so that the guide member 12 can reciprocally move along the shaft 15.

In order to help the guide member 12 move smoothly, a sliding rod 20 is formed with an axially extending longitudinal groove 20' in its surface so as to receive the foremost end 12c of the guide member 12 and permit it to move reciprocally through the groove 20'.

A leaf spring 17 is adapted to prevent the threaded shaft 11 from unexpectedly moving before the guide member 12 is brought into contact with one of the retaining rings 13, 13'. Incidentally, a fishing line 16 adapted to be retrieved onto the spool 2 passes through a slot 12a formed in the guide member 12.

In case of operating the fishing line guide device formed in the above mentioned manner, the transmission gear 1 is first rotated by means of an electric motor to rotate the small gear 5 which is engaged with the inner gear 4 formed at one side of the transmission gear 1. The worm 7 mounted on the shaft 6 supporting the small gear 5, rotates the worm wheel 8 engaged with the worm 7. As a result the bevel gear 10 mounted on the uppermost end of the shaft 9 supporting the worm wheel 8, is engaged with and drives one of the bevel gears 14, 14'.

Thus if in this case the bevel gear 10 is engaged for example with the left hand side bevel gear 14 as shown in FIG. 1, the threaded shaft 11 fixedly supporting this bevel gear 14 is rotated. In this case, the downwardly bent guide member 12 is moved from right to left whereas the spool 2 per se remains unrotatable so that the fishing line 16 is not wound onto the spool 2. If the annular pressing plate 3b of the transmission gear 1 is forced to contact the annular receiving plate 3c of the spool 2 by operating a lever (not shown), the spool 2 is caused to rotate to result in the fishing line 16 being wound onto the spool 2 uniformly through the full axis thereof at an equal speed. Then the guide member 12 is moved along the rotatory threaded shaft 11 to the left until it contacts the retaining ring 13 whereby the shaft 11 is slid to the left. This has a result that the lefthand bevel gear 14 is disengaged from bevel gear 10 which is then engaged with the right hand bevel gear 14'. Consequently the threaded shaft 11 is rotated in the reverse direction and moves the guide member 12 to the right at an equal speed, thus permitting the fishing line 16 to be rewound onto the spool 2 from left to right uniformly at the equal speed.

When the guide member 12 is brought into contact with the retaining ring 13' closer to the right hand end of the rotating shaft 11 it slides the shaft 11 to the right, the bevel gear 14' disengages from bevel gear 10 and the bevel gear 14 is moved into engagement with the bevel gear 10 so that the guide member 12 reverses direction and is moved again to the left.

After the winding operation of the spool 2 is finished, the lever is manipulated to release the engaged relation of the annular pressing plate 3b with the annular receiving plate 3c thereby bringing the rotation of the spool 2 to a halt.

During the winding operation of the spool 2, the leaf spring 17 serves to prevent the threaded shaft 11 from unexpectedly sliding. Further, the guide shaft 15 and the sliding rod 20 prevent the guide member 12 from vibrating which otherwise would be caused due to its reciprocal movement, the result being that the fishing line 16 can be wound on the spool 2 smoothly and uniformly.

From the foregoing it will be easily understood that the fishing line guide device of the present invention is very simple in structure and producible at a low cost, and yet capable of guiding a fishing line onto spool with uniformity over its full axial length.

Though one specific embodiment of the present invention has been shown and described herein, it will be apparent to those skilled in the art that the invention is not restricted to the details set forth but many changes and modifications may be made without departing from the spirit and scope of the invention as deined in the annexed claims.

What is claimed is:

1. A fishing line guide device for use on a fishing reel, said reel comprising a first shaft, a reel spool mounted on said first shaft and arranged to receive a fishing line, a transmission gear mounted on said first shaft adjacent one end of said spool and having a side surface facing the adjacent end of said spool, and the side surface of said transmission gear facing the adjacent end of said spool being frictionally engageable therewith for rotating said spool, said guide device includes an inner gear formed on the opposite side of said transmission gear from the side facing said spool, a minor gear in meshed engagement with said inner gear, a second shaft fixedly supporting said minor gear, a worm fixedly mounted on said second shaft and spaced from said minor gear, a worm gear in engagement with said worm, a third shaft having one end fixedly supporting said worm gear and extending substantially perpendicularly of said second shaft, a first bevel gear mounted on the opposite end of said third shaft spaced from said worm gear, a threaded axially extending shaft disposed in substantially parallel relation with said first shaft and positioned radially outwardly from said spool, said threaded shaft extending for at least the range of said spool and having one end extending axially outwardly from the one end of said spool facing said transmission gear, a fishing line guide member mounted in threaded engagement with said threaded shaft and arranged to move in the axial direction of said threaded shaft as the threaded shaft rotates, a pair of retaining rings secured to said threaded shaft spaced apart thereon in the axial direction of the threaded shaft on the opposite sides of said guide member, said retaining rings spaced from the one end of said threaded shaft which extends axially outwardly from the one end of said spool, a pair of second bevel gears fixedly mounted on the one end of said threaded shaft, said second bevel gears arranged in facing relation and spaced apart on said threaded shaft so that one of them is in meshed engagement with said first bevel gear while the other is disengaged therefrom for rotating said threaded shaft, said fishing line guide member being displaced axially along said threaded shaft as said threaded shaft rotates and travelling between said retaining rings for axially displacing said threaded shaft as said guide member contacts said retaining rings so that as the threaded shaft is axially displaced it disengages the one of said second bevel gears in engagement with said first bevel gear and engages the other second bevel gear with said first bevel gear for reversing the direction of rotational drive of said threaded shaft and thereby reversing the direction of movement of said guide member thereon.

2. A fishing line guide device, as set forth in claim 1, wherein a fixed guide shaft is mounted in parallel relation with and spaced from said threaded shaft, said guide member having a hole therethrough with said fixed guide shaft extending through the hole so that as the guide member moves along the threaded shaft it is slidingly guided along said fixed guide shaft, a sliding rod mounted in parallel relation with said threaded shaft and positioned on the opposite side of said threaded shaft from said fixed guide shaft, said sliding rod having a groove formed in its surface and extending in its axial direction, said guide member supported at one end in said groove in said sliding rod, and said guide member having a slot therein extending transversely of the axial direction of said sliding rod and located in the end of said guide member adjacent said sliding rod and the fishing line being arranged to pass through said slot as it moves to and from said spool.

3. A fishing line guide device, as set forth in claim 1, wherein a leaf spring is positioned in contact with said threaded shaft between the location of said second bevel gears thereon and the adjacent one of said retaining rings, said leaf spring arranged to prevent said threaded shaft from unexpectedly moving in the axial direction until said guide member contacts one of said retaining rings.

* * * * *